United States Patent [19]

Classen

[11] Patent Number: 4,606,412
[45] Date of Patent: Aug. 19, 1986

[54] TINE SUPPORT AND DRIVE MECHANISM FOR A COMPACT SELF-PROPELLED LAWN AERATION MACHINE HAVING MEANS FOR VARYING BOTH FORWARD TRAVEL SPEED AND DEPTH OF TINE PENETRATION

[76] Inventor: Alvin T. Classen, P.O. Box 172, Norfolk, Nebr. 68701

[21] Appl. No.: 700,164

[22] Filed: Feb. 11, 1985

Related U.S. Application Data

[63] Continuation-in-part of Ser. No. 693,439, Jan. 22, 1985.

[51] Int. Cl.⁴ .............................................. A01B 45/02
[52] U.S. Cl. ......................................... 172/22; 74/522
[58] Field of Search ...................... 172/21, 22, 101, 88, 172/86, 84, 87, 89, 95, 42, 43; 111/6, 7; 74/522, 44, 49

[56] References Cited

U.S. PATENT DOCUMENTS

| | | | |
|---|---|---|---|
| 2,453,771 | 11/1948 | White | 74/522 |
| 2,659,285 | 11/1953 | Burr | 172/88 |
| 2,688,907 | 9/1954 | Joy | 172/42 |
| 3,022,834 | 2/1962 | Ruka | 172/21 |
| 3,429,378 | 2/1969 | Mascaro | 172/22 |
| 3,802,513 | 4/1974 | Ploenges | 172/21 |
| 3,986,562 | 10/1976 | Killion | 172/22 |
| 4,084,642 | 4/1978 | Killion | 172/21 |
| 4,154,305 | 5/1979 | Prewett | 172/21 |

Primary Examiner—Richard J. Johnson
Attorney, Agent, or Firm—Sughrue, Mion, Zinn, Macpeak and Seas

[57] ABSTRACT

Paired, side-by-side sets of upper and lower sprocket wheels are commonly chain driven at similar speeds. Crank arms are pivotably mounted at their upper ends to the upper wheels of each set and project slidably through cylindrical bushings fixed to journals rotatably mounted to the lower wheel for rotation about the journal axes, radially displaced from the axis of rotation of the lower wheels. Tines are mounted to the lower ends of the crank arms for penetration into and extraction from the turf to aerate the turf. Machine propulsion is effected automatically as a result of driving the tines into the turf and retraction of the same. Holes at different radial positions within the upper and lower wheels permit the crank arms to be mounted to the upper wheels at different radial positions to control the depth of tine penetration into the turf. Holes at different radial positions within the lower wheels permit mounting of the journals and thus the bushings through which the crank arms slide at different radial positions relative to the axis of rotation of the lower wheels to vary the travel of the tines during penetration and removal from the turf to vary the forward travel speed of the machine. Alternatively, some or all of the wheels for single or multiple wheel sets may constitute idlers which are chain driven and mount either crank arms or jack shafts fixedly bearing a tine at their lower ends.

7 Claims, 4 Drawing Figures

# TINE SUPPORT AND DRIVE MECHANISM FOR A COMPACT SELF-PROPELLED LAWN AERATION MACHINE HAVING MEANS FOR VARYING BOTH FORWARD TRAVEL SPEED AND DEPTH OF TINE PENETRATION

This application is a continuation-in-part application of application Ser. No. 693,439, filed Jan. 22, 1985, entitled "SELF-PROPELLED LAWN AERATION MACHINE", to the applicant.

FIELD OF THE INVENTION

This invention relates to machines for perforating turf, removing plugs and insuring admittance of air, light and water to the roots thereof.

Applicant's parent application Ser. No. 693,439 is incorporated by reference herein and has as its primary object, the provision of an improved self-propelled lawn aeration machine which is of simplified construction, utilizes a single chain driven wheel to effect rotation of a series or sets or upper and lower wheels connected by jack shafts which, in turn, bear the tines under conditions in which the timing of the tine penetration and retraction from the ground or turf may be readily varied, and wherein the tine movement into and out the ground perpendicular thereto is assured.

In that respect, the parent application Ser. No. 693,439 is directed to a light weight, compact, self-propelled lawn aeration machine which takes the form of a generally horizontal chassis platform with an internal combustion engine being mounted on the platform. At least one tine support and drive mechanism is mounted to the platform and is operatively coupled to the engine which drives the same. Each tine support and drive mechanism includes a plurality of tines for cyclic movement downwardly of and beneath the platform to effect penetration of the tines within the underlying turf for aeration thereof and carried by the hollow tine and is removed from the tine subsequent to tine retraction from the turf. The improvement resides in means for fixedly mounting upper and lower vertically spaced hollow cylindrical wheel mounting journals to the platform with their axes horizontal by a shaft rotatably mounted within each journal and protruding to each side of the machine frame angle bar. A first wheel is rigidly fixed to the end of each shaft, and a second wheel is removably mounted to the other end of the shaft, such that the upper and lower wheels are mounted to opposite sides of the wheel mounting journals. The wheels include a plurality of holes at circumferentially spaced positions but at equal radial positions outwardly of the wheel axis. A hollow cylindrical jack shaft journal is provided for each of the wheels and is rotatably mounted via bolt and nut means to a given one of the holes of each wheel. A jack shaft is fixedly connected between and joins the jack shaft journals of each set of wheels. Further, the journals of one wheel set are both connected to holes within the set of wheels angularly offset by less than 180 degrees from the jack shaft journals mounted to respective holes of the other wheel set wheels, such that the wheels of the wheel sets are kept in time by the jack shafts and the timing and direction of rotation of the wheel sets are determined by the direction and degree of angular offset of the jack shafts for the various wheel sets. Tines are fixedly mounted to the jack shaft journals of the lower wheels of both sets and project downwardly and in line with the jack shafts, adjoining the jack shaft journals of each wheel set. As such, the tines enter and leave the turf perpendicular to the ground. Preferably, only one tine enters the turf at a time, and machine propulsion is automatically effected as a result of driving of the tines into the turf and retraction therefrom.

Further, the timing of penetration of the tines into the turf and retraction therefrom may be readily varied by selectively changing the angular position of the jack shaft journals of one wheel set relative to that of the other wheel set for the at least one mechanism. Further, the lower wheel of one of the wheel sets for the at least one tine support and drive mechanism may comprise a sprocket wheel, and the machine further comprises drive means including a drive sprocket operatively coupled to the internal combustion engine and a chain linking the drive sprocket and that sprocket wheel. Further, plural tine support and drive mechanisms may be mounted laterally, side-by-side on the platform. Preferably, a pair of metal risers fixed to the platform extend generally at right angles thereto and upwardly therefrom, parallel to each other. These act to mount at least one of the wheel mounting journals. A main drive shaft extends horizontally across the risers, and journal means are provided for rotatably mounting the drive shaft to for rotation horizontally about its axis. In turn, the internal combustion engine has a drive shaft parallel to the main drive shaft, Vee pulleys are fixedly mounted to the internal combustion engine shaft and the main drive shaft, respectively, and an endless belt is trained over the pulleys under tension by an adjustable mounted idler pulley on the platform to effect drive from the internal combustion engine to the pulley fixed to the main drive shaft. To effect rotation of the two tine support and drive mechanisms, a pair of drive sprockets are mounted to the main drive shaft in line with the lower wheel of each of the tine support and drive mechanisms. An endless chain engages a drive sprocket and the lower sprocket wheel for each of the mechanisms, and the sizes of the drive sprockets and the sprocket wheels are such that the sprocket wheels rotate at high speed to function as highly effective flywheels to maximize the force tending to drive the tines carried by all lower wheels into the turf and remove the same, thereby improving machine self-propulsion.

While the self-propelled lawn aeration machine of my prior application is quite effective, and wherein the lower wheels function as high speed flywheels to provide more than adequate force for penetrating the hollow tines into the turf and retraction therefrom in timed sequence, even when the turf is relatively dry and hard, and wherein the tines enter the ground and are retracted therefrom perpendicular to the surface of the turf, there is a need for a machine wherein one of the wheels of the upper and lower dual wheel sets may function to control the depth of penetration of the tines while the other controls the extent of travel provided to the machine by penetration and retraction of a given tine during wheel rotation.

It is, therefore, a primary object of the present invention to provide an improved tine support and drive mechanism for a self-propelled lawn aeration machine which is of simplified construction, which utilizes chains to drive given upper and lower wheels of a wheel set to effect timing between the wheels, and wherein the upper wheel of each wheel set determines the depth of penetration of the tine bore by a crank arm emanating from the upper wheel, while the lower wheel determines the extend of travel of the machine over the turf as a result of tine penetration and removal.

SUMMARY OF THE INVENTION

In one form, the invention constitutes an improved tine support and drive mechanism for a lightweight, compact self-propelled lawn aeration machine of the type having a generally horizontal chassis platform for movement over underlying lawn turf, and wherein the tine support and drive mechanism is mounted to the platform. The support and drive mechanism includes a plurality of tines for cyclic movement downwardly of the platform for penetration within the underlying turf for aeration thereof and retraction therefrom, such that machine propulsion is automatically effected as a result of driving of the tines sequentially into the turf and retraction therefrom. The tine support and drive mechanism comprises a plurality of wheel sets mounted transversely in side by side fashion on the platform, and each wheel set comprises upper and lower vertically aligned wheels mounted for rotation about parallel axes, with the wheel sets having the tines mounted thereto for cyclic movement as a result of rotation of the wheels. The improvement resides in at least one of the wheel sets comprising upper and lower sprocket wheels, and means for mounting the upper and lower sprocket wheels to the platform as idlers for free rotation about their axes. A crank arm is pivotably mounted by means of a crank pin at one end of the arm to the side of the upper sprocket wheel at a position radially outwardly of the axis of rotation of the upper sprocket wheel. A cylindrical guide bushing or guide sleeve is rotatably mounted to the side of the lower sprocket wheels radially outward of the axis of rotation of the lower sprocket wheel and is axially in line with and slidably receives the crank arm. A tine is fixed to the end of the crank arm remote from the crank pin connection to the upper sprocket wheel with the tine projecting below the platform. Means are provided for selectively radially adjusting the connection of the upper end of the crank arm to the upper sprocket wheel and the guide sleeve to the lower sprocket wheel. An endless chain is trained about the upper and lower sprocket wheels, and means are provided for connecting the endless chain to a power source such that the sprocket wheels are driven by the chain and maintained in timed synchronism. The radial connection of the upper end of the crank arm to the upper sprocket wheel controls the depth of tine penetration into the turf, and the radial position of the guide bushing bearing the crank arm on the lower sprocket wheel controls the forward travel speed of the machine as a result of penetration of the tines into the turf and removal of the tines from the turf.

Preferably, the upper and lower wheels of the wheel sets comprise a series of radially spaced, radially in line holes with the crank pin pivotably connecting the upper end of the crank arm to the upper wheel, being selectively fitted to a given one of the holes within the upper wheel, and the guide sleeve being bolt mounted for rotation about the bolt axis to a given one of the holes within the lower wheel. A hollow journal may be provided for each of the wheels with bolt and nut means rotatably mounting the journals, respectively, at a given one of the holes of each wheel and with the crank arm being fixedly connected at one end to the journal at the upper wheel and with the guide bushing being integrated to the journal at the lower wheel with its axis at right angles to the axis of the journal and spanning across the exterior of the journal within which the crank arm slidably reciprocates during rotation of the wheels.

In another form, the chassis platform includes at least one riser fixed to the platform and extending generally at right angles thereto and generally vertically upward. A pair of cylindrical axles are fixed, respectively, to the platform and to the metal riser and are vertically in line with each other. The upper and lower wheels include central bores, and the upper and lower wheels are rotatably mounted on respective axles with the axles projecting within the bores, such that the sprocket wheels function as idlers rotating about respective axles. Alternatively, the upper and lower wheels, while comprising idlers and being mounted for free rotation about their axes, rotatably support on their sides timing shafts or jack shafts which extend between the upper and lower wheels of each wheel set and are pivotably mounted at opposite ends for pivoting about a horizontal axis parallel to the axis of the wheels bearing the same and radially outboard of the wheel axes. A tine is fixedly mounted to each timing shaft and projects beyond the pivot connection between the lower end of the timing shaft and the lower wheel for projection into and removal from the turf.

DESCRIPTION OF THE PREFERRED EMBODIMENT

The present invention consitutes a specific tine support and drive mechanism for a self-propelled lawn aeration machine, as set forth in prior patent application Ser. No. 693,439, the content of which is incorporated by reference herein. Reference may be had to said application for a better understanding and appreciation of how the tine support and drive mechanism of the present invention functions in conjunction with operation of such machine and generally under principles common to both the machine of the prior application and that utilizing one or more tine mounting and driving mechanisms as variously illustrated in the figures herein.

Figure 1:
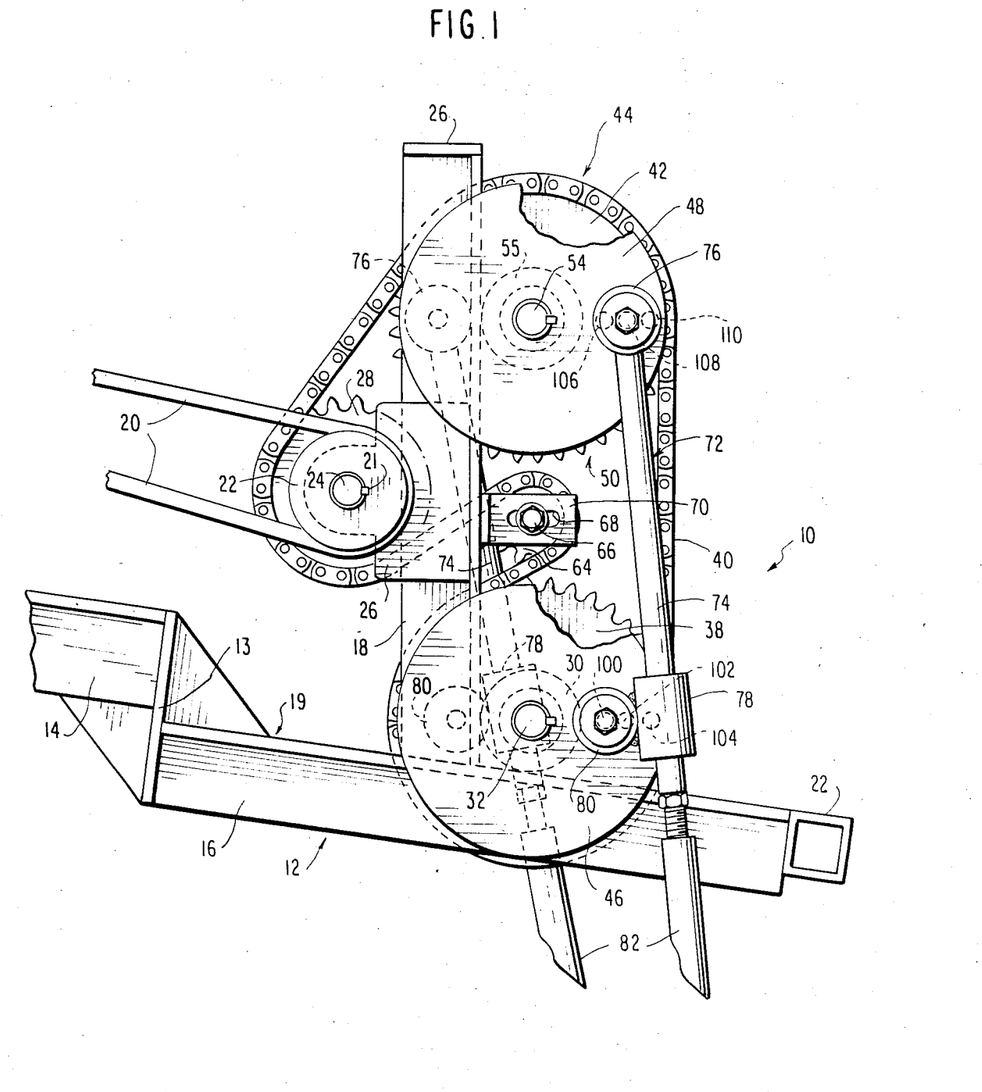
FIG. 1 is a side elevational view of a tine support and drive system for a self-propelled lawn aeration machine and forming a preferred embodiment of the present invention.
Figure 2:
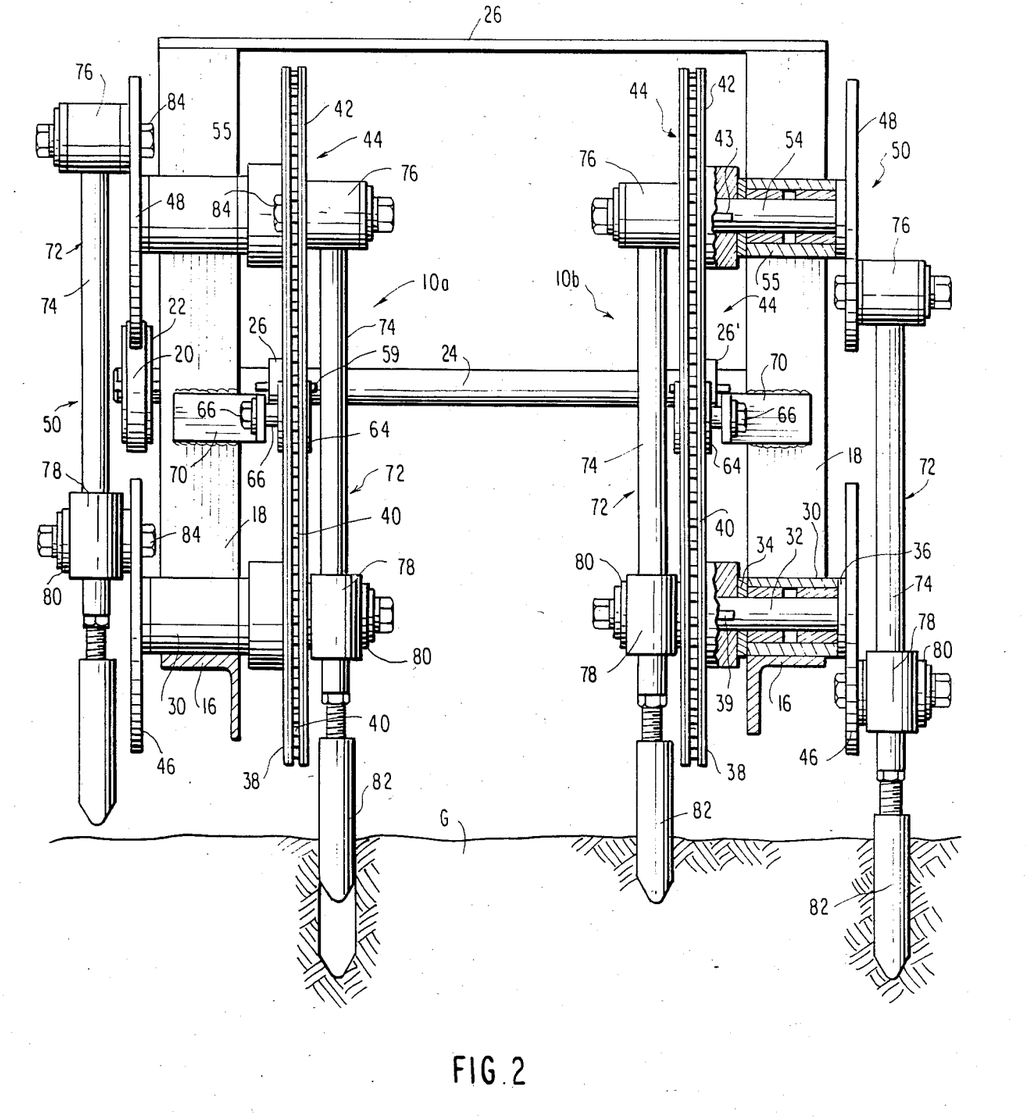
FIG. 2 is a vertical, transverse sectional view of the tine support and drive mechanism illustrated in FIG. 1.

As shown in FIGS. 1 and 2, a pair of tine support and drive mechanism, indicated generally at 10a, 10b, are supported by a self-propelled lawn aeration machine chassis or wheeled frame indicated generally at 12, bearing the components of the machine. The portion of the chassis 12, illustrated in FIGS. 1 and 2 is formed by a pair of vertically offset angle bars 14, 16 provided on each side of the machine, which angle bars 14 and 16 are welded together at their intersecting ends, via plates 13. Crossbars are welded across the opposite ends of angle bars 14, 16 from the joint, and in that regard, crossbar 22 is shown as welded at its ends, across the ends of angle bars 16. Generally vertical risers 18 are welded at their bottoms to the tops of angle bars 16 and are joined together at their upper ends by a transverse crossbar 26 welded at its ends to the tops of the vertical risers 18. The angle bars 16 define with crossbar 22 a rear platform, indicated generally at 19, forming a relatively rigid support structure for one or more tine support and drive mechanisms such as mechanisms 10a and 10b. Inclined struts or reinforcing plates (not shown) may be welded at opposite ends to angle bar 14 and risers 18 to further strengthen the risers and rigidify the support and drive mechanisms 10a, 10b.

In the exact manner of my referred to prior application, an internal combustion engine (not shown) functions to drive, through a Vee type drive pulley, an endless belt 20 which is trained about a driven pulley 22 which is fixedly coupled as by keying at 21 to a main drive shaft 24. Shaft 24 extends horizontally across and above platform 19. The main drive shaft 24 may be journaled for rotation within brackets 26, only one of which is shown in FIG. 1, mounted to riser 18, the opposite end of the shaft 24 being journaled for rotation about its axis within a similar bracket 26' welded or otherwise fixed to the second riser 18 mounted to and extending generally vertically upward from platform 19.

As may be seen in FIGS. 1 and 2, the main shaft 24 has fixed thereto a pair of drive sprocket wheels 28 whose integral hubs facilitate a mechanical drive connection to the drive shaft 24, as by a key 59. The sprockets 28 form one component of each, duplicate tine support and drive mechanism 10a, 10b illustrated in FIG. 2, although one, two, three or more such tine support and drive mechanisms of identical form may be carried by chassis 12. A hollow, cylindrical metal journal 30 is be welded to the top of each angle bar 16 adjacent to each riser 18 with their axes horizontal. A wheel mounting shaft 32 is journaled in each journal for rotation about its axis via opposed bearing halves 34, 36. Each shaft 32 mounts a lower primary or drive sprocket wheel 38 which is coupled via endless chain 40 to a respective sprocket wheel 28 mounted to the main shaft 24. In line with the lower sprocket wheel 38, is an upper sprocket wheel 42 for each wheel set 44, to the inside of chassis frame member 16.

In the arrangement shown in FIGS. 1 and 2, a crank arm assembly 72 is composed of crank arm or crank rod 74 mounted by way of journal or bushing 76 and bolt 84, (functioning as a crank pin) to the upper sprocket wheel 42, such that the crank arm or crank rod 74 freely pivots about the axis of the bolt or crank pin 84 at its upper end. The lower part of the crank arm or crank rod 74 slides within a guide sleeve or guide bushing 78 which is welded to the outer periphery of the lower journal 80, at right angles to the axes of bushing 80. Likewise, for a wheel set 50, an upper journal or bushing 76 is pivotably mounted by way of bolt or crank pin 84 to the upper wheel 48 of wheel set 50, and the lower end crank arm or crank rod 74 slides within a guide sleeve or guide bushing 76 welded to the periphery of a lower bushing or journal 80, with its axis at right angles to the axis of the journal. The lower end of the crank rod 74 slides freely within the guide sleeve 76 whose internal diameter is slightly larger than the diameter of the crank arm or rod 74.

As may be appreciated, there is an angular offset between the pivot mounting of crank arm assembly 72 for wheel set 50 from that of wheel set 44 for each mechanism 10a, 10b. In like fashion to wheel set 44, there are provided within all of the wheels, whether sprocket wheels or non-sprocket wheels as at 46, 48 for wheel set 50, a series of the holes for variably mounting journals borne by the wheels. Referring to FIG. 1, it may be seen that for the lower sprocket wheel 46 of wheel set 50, there are three, equal diameter, radially displaced, but radially in line holes as at 100, 102 and 104. Similarly, there are provided three equal diameter, radially spaced but radially in line holes 106, 108 and 110 within the upper sprocket wheel 48 of wheel set 50. These holes permit the bushings or journals 80 and 76, respectively, for the lower sprocket wheel 46 and upper sprocket wheel 48, to be mounted at one of three radially displaced positions. For the illustrated embodiment of FIGS. 1 and 2, the journals 80 and 76 of wheel set 50, are bolt mounted by way of bolts 84 to sprocket wheels 46, 48 via holes 100 and 108, respectively.

This permits separate and independent adjustment of tine penetration depth for tines 82 and the extent of movement of the self-propelled lawn aeration machine in the direction of machine travel for each wheel set, as a result of initial penetration of the tines 82 into the ground or turf and extraction therefrom. Wheel sets 44 are similarly set up for both mechanisms 10a and 10b.

Shaft 66 projects through an elongated slot 68 within further brackets 70, which brackets are welded to risers 18 and extend outwardly from risers 18 to the opposite side from brackets 26. A small diameter sprocket wheel 64 fixed to each shaft 66 and each has chain 40 leaved thereabout. Sprocket wheels 64 function to permit the adjustability necessary to take up the slack within the chains 40. By loosening the bolts 66 mounting the sprockets 64 to brackets 70, the chains 40 can be loosened sufficiently to permit a shift or change in rotation of one of the sprocket wheels 38, 42 with respect to the other to properly set wheels 38 and 42 angularly, relative to each other. Timing is maintained by the chain drive for wheel sets 44.

A key aspect of the embodiment of FIGS. 1 and 2 of the present invention is the make up and adjustable mounting of a crank arm assembly 72 for each of the wheel sets of mechanisms 10a, 10b. In that respect, each crank arm assembly 72 is comprised of a rodlike crank arm 74 which is welded at its upper end to the outer periphery of hollow, cylindrical journal 76, while the crank arm 74 is slidably received by a guide sleeve or guide bushing 78. Sleeve or bushing 78 is welded to the outer periphery of a hollow, cylindrical journal 80 which is mounted for rotation about its axis to and projects outwardly from one side of the lower sprocket wheel of each wheel set 44. The lower end of each crank arm 74 terminates in a tine 82 which tine 82 is preferably hollow and takes the form of that shown in my prior application.

The mounting of both upper and lower journals 76, 80 to respective sprocket wheels 42, 38 for wheel set 44 is achieved by way of bolts 84 which pass through the journals and through paired opposed bearing halves anf flat washer 90 in the exact manner of my prior filed application. Nuts 94 are tightened down on the threaded end of bolts 84. Further, as may appreciated by reference to FIG. 1, bolts 84 which mount all of the journals 76, 80 for sprocket wheels 42, 38, respectively, for wheel set 44, and in similar fashion for journals 76 and 80 of wheels 48 and 46 forming wheel set 50, may be selectively positioned in one of the series of radially different mounting holes.

The adjustment for varying the depth of penetration of the tines 82 is achieved by selecting the radial pivot point connection between the journal or bushing 76 carried by the upper wheel of any given wheel set such as sprocket wheel 42 of wheel set 44 by mounting the upper bolt 84 which constitutes the crank pin of the mechanism to a given one of radially displaced but in line holes 106, 108 and 110 of wheel 42. The selection of the intermediate hole 108 provides the intermediate depth penetration. As the pivot connection to the wheel 42 is shifted radially outward from axis 112 of the upper sprocket wheel 42, the tine 82 will penetrate to a greater depth within the ground or turf during sequential insertion and removal from the ground.

The determination of the extent of travel of the machine, which is moved solely as a result of tine penetration and removal, is effected by the radial position of the guide sleeve or guide bushing 78 relative to the axis of rotation of a lower wheel such as sprocket wheel 38.

The embodiment of the invention shown in FIGS. 1 and 2, in accordance with my prior application, utilizes shafts 32 and 54 which extend transversely across frame member 16 and the shafts 32 and 54 are integral with wheels 46 and 48, respectively, sprocket wheels 38 and 42 are keyed at 30 and 43 to respective shafts 32 and 54 to the opposite side of frame members 16. Alternative structural arrangements may be employed, resulting in significantly narrower lateral spacing between the tines of respective wheel sets. Journals 55, via bearing halves rotatably mount shafts 54, the journals 54 being welded on their peripheries to respective risers 18 parallel to journals 30.

Figures 3, 4:
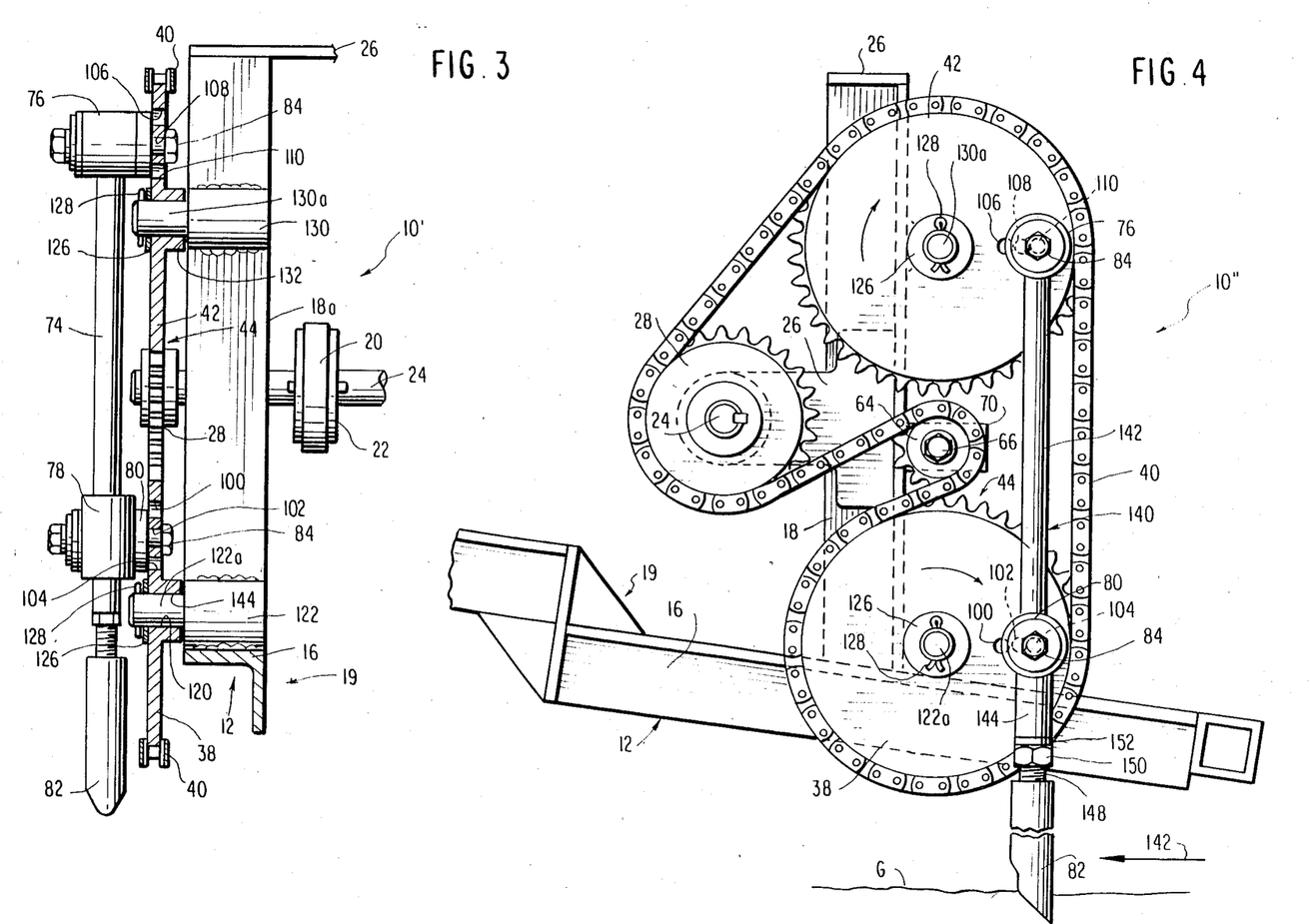
FIG. 3 is a vertical, transverse sectional view of an alternate form of tine support and drive mechanism forming a second embodiment of the present invention.
FIG. 4 is a tine mounting and drive mechanism of the present invention for a self-propelled lawn aeration machine forming yet a third embodiment of the present invention.

FIG. 3 shows an alternate arrangement constituting a second embodiment of the invention in which all of the wheel sets (only a single wheel set being shown) utilize idler wheels which are not shaft connected to respective wheels of an adjacent wheel set to the opposite side of frame 16. In this case, like elements have like numerical designations. For the single tine support and drive mechanism 10' shown, the chassis 12 again comprises a platform angle bar or frame member 16 which extends generally longitudinally fore and aft of the machine and upon each of which mounts riser 18. A crossbar 26 joins risers at their upper ends to rigidify the supporting structure for the wheel set or wheel sets mounted on top of platform 19. In this case, all of the wheel sets are chain driven, and all wheels constitute sprocket wheels, such as at 38 and 42 for a wheel set 44. The lower sprocket wheel 38 is provided with a central bore as at 120 which receives reduced diameter portion 122a of a solid shaft or axle 122 welded to the upper face of the chassis or frame angle bar 16. The axis of shaft 122 is horizontal. End 122a of the shaft 122 extends beyond the edge of the angle bar, and that end 122a of the shaft 122 defines, with the axle proper, a radial shoulder 124. Bore 120 within the sprocket wheel 38 is of a diameter slightly larger than the reduced diameter portion 122a of the shaft 122.

Thus, the lower sprocket wheel 38 operates as an idler. That is, it is freely revolvable about the axis of shaft 122. The lower sprocket wheel 38 is maintained in position by means of a washer 126 which fits onto the end 122a of the shaft 122, and a cotter pin or the like as at 128 passing through shaft portion 122a backs the washer 126 to maintain the sprocket wheel on the shaft reduced diameter portion 122a.

Instead of a journal or bushing, as per the embodiment of FIGS. 1 and 2, a second solid shaft or axle 130 is welded to face 18a of the riser 18 at a given vertical height with the axis of shaft 130 also horizontal and in line with that of shaft 122 supporting the lower sprocket wheel 38. The upper sprocket wheel 42 also operates as an idler and is freely revolvable about the axis of shaft 130, being rotatably mounted on a reduced diameter shaft portion 130a. A washer 126 is positioned on the reduced diameter portion 130a of shaft 130, and a cotter pin or the like as at 128 passing through the shaft reduced diameter portion 130a maintains the upper sprocket wheel on the reduced diameter portion 130a of the shaft 130. The wheel 42 abuts a radial shoulder 132 where the reduced diameter portion 130a of shaft 130 initiates to maintain the upper sprocket wheel 42 in line with the lower sprocket wheel 38 and forming the wheel set 44.

In similar fashion to the prior embodiment, a drive pulley 22 bearing endless belt 20 connected to an internal combustion engine (not shown) via a second pulley (not shown) functions to rotate main drive shaft 24. Shaft 24 is mounted for rotation about its axis via brackets (not shown) in similar fashion to the first embodiment, and the shaft 24 bears for each of the wheel sets, a small diameter drive sprocket 28 about which is trained endless chain 40 in much the same manner as the first embodiment. The drive system may include an adjustable tensioning sprocket (not shown in this embodiment) but identical to that of the embodiment of FIGS. 1 and 2. The endless chain 40 is trained about both the upper and lower sprocket wheels 42, 38 to complete the drive.

In the embodiment of FIG. 3, a crank arm assembly 72, identical to that of the embodiment of FIGS. 1 and 2, is employed and is mounted to respective lower and upper sprocket wheels 38, 42 of the wheel set 44. As such, an upper journal or bushing 76 is mounted for rotation about the axis of bolt 84 or crank pin and the upper end of a crank arm or crank rod 74 is welded to the outside of the journal 76. Additionally, a guide sleeve or guide bushing 78 is welded to the periphery of the lower journal or bushing 80, and whose axis extends at right angles to the axis of that bushing, slidably receives the lower end of the crank arm or crank rod 74. The crank rod 74 terminates in a tine 82 in the identical fashion to the embodiment of FIG. 2.

The difference in this case is that laterally across the complete assembly there are a series of wheel sets in addition to wheel set 44 which are mirror images of wheel set 44, which are all identically driven by separate chains 40 and wherein all of the wheels of the wheel sets are sprocket wheels chain drive by individual chains 40 and all receiving that drive via separate small diameter sprocket drive wheels 28. As such, timing is effected through the main shaft 24 via the individual chains 40 and out of phase driving of the tines is achieved by presetting the angular positions of respective upper and lower wheels of each wheel set as desired.

Similar to the embodiment of FIGS. 1 and 2, the sprocket wheels carry a plurality of radially spaced, and radially in line holes identical to holes 100, 102 and 104 in the lower sprocket wheel 38 and holes 106, 108 and 110 for the upper wheel 42 of the first embodiment, those holes all being radially outward of axis 114 for the lower sprocket wheel 38 and axis 112 for the upper sprocket wheel 42.

Referring next to FIG. 4, there is shown yet another embodiment of the invention. This embodiment is quite similar to that of FIG. 3, and again like numerals identify like elements. However, the a difference lies in the fact that instead of a crank arm assembly 72, being mounted between an upper wheel and a lower wheel of each wheel set, similar to copending application Ser. No. 693,439, a timing shaft assembly or jack shaft assembly 140 is employed. Each timing shaft assembly or jack shaft assembly 140 is adjustably mounted to respective lower wheel 38 and upper wheel 42 of the wheel set 44 at radially displaced positions to change both the penetration depth of the tine 82 carried thereby within the turf or ground G, and the extent of machine travel over the period of initial penetration of that tine 82 into the turf and retraction from the same, as the machine travels forwardly in the direction of the arrow 142, FIG. 4. Thus, the tine support and drive mechanism 10″ in the embodiment of FIG. 4 involves again a similar chassis 12 utilizing angle arms or frame members 16, and risers 18 mounted as by welding to the upper surface of angle bars 16 and rising upwardly therefrom and being joined at their upper ends by cross bar 26.

As a matter of fact, similar to FIG. 3, while there is illustrated solely a single wheel set 44, involving a lower sprocket wheel 38 and an upper sprocket wheel 42 as idlers, a plurality of completely independent wheel sets may be utilized, whose idler wheels are closely spaced and transversely in line, across the machine. In that respect, in identical fashion to FIG. 3, the lower sprocket wheel 38 is mounted for rotation about its axis by means of a shaft or 122 welded to the upper face of the angle bar 16 and extending horizontally. The lower sprocket wheel 38 (as well as the upper sprocket wheel 42) being idlers are freely rotatable about the axes of the shafts mounting the same. In this case, the shaft terminates in a reduced diameter portion 122a forming a radial shoulder with the shaft proper. The shaft reduced diameter portion 122a rotatably carries a free wheeling sprocket wheel 38 in idler fashion and bears a flat washer 126 thereon. Within a hole 127 drilled through shaft portion 122a is cotter pin 128 to maintain the wheel in position, between the flat washer 126 and the shaft radial shoulder (not shown).

The upper sprocket wheel 42 of wheel set 44 is likewise shaft or axle mounted by means of a shaft which terminates in a reduced diameter portion 130a through which is a drilled hole. The hole receives a cotter pin 128 behind flat washer 126. Sprocket wheel 42 has its inner face abutting a radial shoulder formed between the reduced diameter portion 130a of the shaft and the shaft proper.

Similar to the embodiment of FIGS. 1 and 2, an endless chain 40 is trained about these two sprocket wheels and preferably two additional wheels, a tensioning sprocket wheel 64 which is adjustably mounted on a bracket 70 which, in turn, is welded to the riser 18. Additionally, a pair of brackets 126 rotatably mount the main drive shaft 24 having fixed thereto a relatively small diameter main drive shaft drive pulley 22 and a drive sprocket wheel 28. The chain 40 is trained about drive sprocket wheel 20. With the chain 40 tensioned, and with the idler sprocket wheels 38, 42 preset at angular positions, the three radial holes 100, 102 and 104 of wheel 92 correspond in poairion to similar holes 106, 108 and 110, within the upper sprocket wheel 42, a timing shaft assembly or jack shaft assembly 140 may be readily mounted to wheels 38, 42 as shown.

In FIG. 4, the radially outermost holes 104 and 110 for wheels 38 and 42, respectively, are selected so that the radial penetration depth of tine 82 is maximized as well as the extent of forward travel of the machine in the direction of arrow 142 as defined by the distance between the point of initial penetration of a tine 82 into the turf G and the retraction of the same during rotation of the wheels 38, 42 in a clockwise direction. An endless belt (not shown) trained over a main drive shaft pulley (not shown) whose movement is initiated from an internal combustion engine or the like (not shown) carried by the platform 19 drives mechanism 10‴, identical to that in FIG. 1.

The timing shaft assembly or jack shaft assembly 140 includes an upper journal or bushing 76 which is mounted for rotation about its axis by a bolt 84, to hole 110 of wheel 42, in the exact manner of the embodiment of FIGS. 1 and 2 with a timing shaft or jack shaft 142 being rigidly welded to the bushing 76 at its upper end and being rigidly fixed as by being welded at its lower end to the exterior of a lower bushing 80. Timing shaft 142 insures (along with the endless chain 40) the synchronous rotation of the two equi-sized sprocket wheels 38, 42. Bushing or journal 80 is mmounted for rotation about its axis by way of bolt 84 to wheel 38. Bolt 84 is fixedly borne by and passes through the radially outermost hole 104 within the lower sprocket wheel 38.

Welded to the bottom of bushing 80 and projecting outwardly therefrom, in line with timing shaft 142, is a tubular extension 144 of similar size to timing shaft 142 which is threaded interiorly of the same at the end radially outboard of bushing or journal 80. It threadably receives the threaded shaft portion 148 of a stud welded to and extending upwardly from hollow tine 82. The threaded stud 148 carries a lock nut 150 and a lock washer 152 so as to lock the tine 82 at a preset position relative to the lower end of the extension tube 144.

As may be appreciated, while chain 40 is shown as engaging wheels 38 and 42 which are both sprocket wheels, it is necessary only that the chain 40 be trained about main drive sprocket wheel 28 and the lower sprocket wheel 38 (as well as the tensioning sprocket wheel 64 if desired or necessary) in order to implement the timed driving of that or a plurality of wheel sets. In this case, the upper wheel 42 does not need to be a sprocket wheel, and the timing shaft or jack shaft 142 will effect the connection and timing between the wheels of a given wheel set. Of course, the timing shaft assemblies 140 for the various wheel sets are set at various angular positions, and it is this angular setting of those assemblies that determines the sequence of tine penetration and removal to self-propel the machine from the turf or ground G.

Since both wheels 38 and 42 are idler wheels and are freely revolvable about their axes on given shafts 122, 130, the machines of FIGS. 3 and 4, utilizing one or more wheel sets is extremely light weight, can be easily set up and easily driven, particularly maximizing the power applied to the lower sprocket wheels 38 to impart a significantly large driving force to tines 82 using the lower sprocket wheel as the inertia member or flywheel.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An improved, tine support and drive mechanism for a lightweight, compact self-propelled lawn aeration machine, said machine comprising:

a generally horizontal chassis platform for movement over underlying lawn turf, said at least one tine support and drive mechanism being mounted to said platform and including a plurality of tines for cyclic movement downwardly of said platform for penetration within the underlying turf for aeration thereof and retraction therefrom, such that machine propulsion is automatically effected as a result of driving of the tines sequentially into the turf and retraction therefrom, and wherein said tine support and drive mechanism comprises a plurality of wheel sets mounted transversely in side-by-side fashion on said platform, each said wheel set comprising upper and lower vertically aligned wheels mounted for rotation about parallel axes, with said wheel sets having said tines mounted thereto for cyclic movement as a result of rotation of said wheels, the improvement wherein:

at least one of said wheel sets comprise upper and lower sprocket wheels, means for mounting said upper and lower sprocket wheels to said platform as idlers for free rotation about their axes, a crank arm, a crank pin pivotably mounting one end of said crank arm to the side of said upper sprocket wheel at a position radially outwardly of the axis of rotation of said upper sprocket wheel, a cylindrical guide bushing rotatably mounted to the side of said lower sprocket wheel radially outward of the axis of rotation of said lower sprocket wheel, said guide bushing being axially in line with and slidably receiving said crank arm, a tine fixed to the end of said crank arm remote from said crank pin connection to said upper sprocket wheel and projecting below said platform, means for selectively radially adjusting the pivotable connection of said upper end of said crank arm to said upper sprocket wheel and the rotatable connection of said guide bushing to said lower sprocket wheel, an endless chain trained about said upper and lower sprocket wheels, and means for connecting said endless chain to a power source such that said sprocket wheels are driven by said chain and maintained in timed synchronism, whereby the radial position of the connection of the upper end of said crank arm to the upper sprocket wheel controls the depth of tine penetration into the turf, and the radial position of said guide bushing bearing said crank arm on said lower sprocket wheel controlling the forward travel speed of the machine as a result of sequential penetration of the tines into the turf and removal of the tines from the turf.

2. The tine support and drive mechanism as claimed in claim 1, wherein said upper and lower wheels of said at least one wheel set comprises a series of radially spaced, radially in line holes, and wherein said crank pin pivotably connecting the upper end of said crank arm to the upper wheel is selectively fitted to a given one of said holes within said upper wheel, and wherein said guide bushing is bolt mounted for rotation about the bolt axis to a given one of said holes within said lower wheel.

3. The tine support and drive mechanism as claimed in claim 2, wherein a hollow journal is provided for each of said wheels of said at least one wheel set, bolt and nut means rotatably mount said journals respectively at a given one of said holes of each wheel, said crank arm is fixedly connected at one end to the periphery of said journal at said upper wheel, said guide bushing is integrated to said journal at said lower wheel with its axis at right angles to the axis of the journal and spans across the exterior of said journal within which said crank arm slidably reciprocates during rotation of said wheels.

4. The tine support and drive mechanism as claimed in claim 1, wherein said chassis platform includes at least one riser fixed to said platform and extending generally at right angles thereto and generally vertically upward, wherein a pair of cylindrical axles are fixed respectively to said platform and to said metal riser and are vertically in line with each other, said upper and lower wheels include central bores, and said upper and lower wheels are rotatably mounted on respective axles with the axles projecting within said bores, such that said sprocket wheels function as idlers rotating about respective axles.

5. The tine support and drive mechanism as claimed in claim 4, wherein said wheel sets comprises a pair of wheel sets, said at least one metal riser is fixed to said platform and extends generally at right angles thereto and generally vertically upwardly therefrom, a first wheel mounting journal is welded to said platform adjacent said metal riser, a second wheel mounting journal is welded to said metal riser above said platform, the axes of said wheel mounting journals are horizontal and parallel to each other, said mechanism includes a main drive shaft, means for rotatably mounting said main drive shaft to said riser for rotation horizontally about its axis, a drive sprocket mounted to said main drive shaft, an endless chain trained over said drive sprocket mounted to said main drive shaft and said upper and lower sprocket wheels for driving said sprocket wheels timed to rotation of said main drive shaft, and wherein shafts extend through said wheel mounting journals, said upper and lower sprocket wheels are fixed to the ends of said shafts to a given side of said journal and a second pair of upper and lower wheels are fixedly mounted to said shaft to the opposite side of said wheel mounting journals and forming a second wheel set, and wherein a crank arm bearing a tine at a lower end thereof is crank pin connected to the upper wheel of said second wheel set and is slidably connected to the lower wheel of said second wheel set at radial positions corresponding to those of said first wheel set, but angularly offset with respect to the wheels of said first wheel set to sequentially effect alternate tine penetration of and retraction from the turf underlying said chassis platform under powered rotation of said main drive shaft.

6. A tine support and drive mechanism for a lightweight, compact, self-propelled lawn aeration machine including a generally horizontal chassis platform for movement across and above the turf, said at least one tine support and drive mechanism including a plurality of tines for cyclic movement of said tines downwardly of said platform for penetration into and retraction from the underlying turf for aeration thereof and for self-propelling of said platform as a result thereof, the improvement comprising:

a plurality of individual wheel sets transversely mounted in side-by-side position on said chassis platform, said wheel sets each including upper and lower wheels, said upper and lower wheels comprising idlers and being mounted for free rotation about their axes, timing shafts extending between the upper and lower wheels of each said wheel set along the sides thereof, and being pivotably mounted at opposite ends for pivoting about horiziontal axes parallel to the axis of the wheels bearing the same and radially outboard of the wheel axes, a tine fixedly mounted to each said timing shafts and projecting beyond the pivot connection between the lower end of said timing shaft and said lower wheel for projection into and removal from the turf, at least the lower wheel of each said wheel set comprising a sprocket wheel, a main drive shaft extending horizontally across said platform and mounted thereto for rotation about its axis, individual drive sprockets fixedly mounted to said main drive sprocket for rotation about the axis of said main drive shaft, individual chains connecting respectively at least, said drive sprockets on said main drive shaft and the lower sprocket wheels of said wheel sets, such that the timing of penetration and removal of the tines from the turf is controlled by said chains and said main drive shaft, and wherein means are provided for selectively effecting pivot connections between the ends of said timing shaft and said upper and lower wheels of each said wheel set at correspondingly variable radial positions to vary the depth of penetration of the tines and the extent of travel of said chassis as a result of cyclic penetration and retraction of the tines from the turf.

7. The tine support and drive mechanism as claimed in claim 6, wherein a hollow journal is provided for each of said wheels of each of said wheel sets, each of said wheels include a plurality of equi-sized holes at radially spaced, radially in line positions outwardly of the axis of each said wheels, bolt and nut means rotatably mount said journals respectively at a given one of said holes of said wheels for rotation about the journal axes, and each timing shaft is fixed at its ends to the periphery of the journals of said wheels of each wheel set to effect rotation of said wheels in unison.

* * * * *